US007100927B2

(12) United States Patent
Krent

(10) Patent No.: US 7,100,927 B2
(45) Date of Patent: Sep. 5, 2006

(54) ARTICULATED STEERABLE SLED

(76) Inventor: Edward D. Krent, 207 Hampton Rd., Sharon, MA (US) 02067

( * ) Notice: Subject to any disclaimer, the term of this patent is extended or adjusted under 35 U.S.C. 154(b) by 0 days.

(21) Appl. No.: 10/808,661

(22) Filed: Mar. 25, 2004

(65) Prior Publication Data

US 2005/0212230 A1 Sep. 29, 2005

(51) Int. Cl.
*B62B 13/08* (2006.01)

(52) U.S. Cl. .............................. 280/16; 15/17; 15/21.1; 15/28.16; 15/18; 15/20; 15/22

(58) Field of Classification Search ................. 280/15, 280/16, 17, 21.1, 28.16, 18, 20, 22
See application file for complete search history.

(56) References Cited

U.S. PATENT DOCUMENTS

| 3,079,617 | A | * | 3/1963 | Brasch ......................... 441/65 |
| 3,705,730 | A | * | 12/1972 | Bergsland ..................... 280/24 |
| 4,262,919 | A | * | 4/1981 | Krent ........................... 280/16 |
| 4,805,937 | A | * | 2/1989 | Boucher et al. ......... 280/33.992 |
| 5,618,051 | A | * | 4/1997 | Kobylenski et al. ..... 280/14.21 |
| 5,865,446 | A | * | 2/1999 | Kobylenski et al. ..... 280/14.23 |
| 6,270,091 | B1 | * | 8/2001 | Smith ....................... 280/14.21 |
| 6,623,018 | B1 | * | 9/2003 | Fireman et al. ............... 280/18 |

\* cited by examiner

*Primary Examiner*—Christopher P. Ellis
*Assistant Examiner*—Cynthia F. Collado
(74) *Attorney, Agent, or Firm*—Cesari and McKenna, LLP; William A. Loginov

(57) ABSTRACT

This invention overcomes the disadvantages of the prior art by providing an articulated, multi-segment sled body having, on each segment, a pair of runners each having opposing convex side edges. These convex side edges allow turning to occur on each of the appropriate inside and outside edges of opposite runners in each segment with the rider leaning into the turn, rather than away from it. A detachable and flexible joint connector is provided between each segment. This connector allows (with respect to a sled longitudinal axis) both yaw-direction rotation between segments as well as axial roll-direction rotation between segments (e.g., two-axis rotation) so as to provide the rider better control and more conformance over bumps and uneven terrain. In an illustrative embodiment, the runners of each segment include a gently sloped (relatively low angle relative to the ground) leading end. The front segment, along its top, also includes a pair of T-shaped handles for better grip and steering control. The bottom sliding surface of each of the runners can be provided with one or more a molded-in, metal edges that provide further strength, stiffness and carving ability on hard-packed snow and ice. The connectors include a relatively thin web joining opposing cylindrical ends in the manner of a "dog bone" shape.

19 Claims, 7 Drawing Sheets

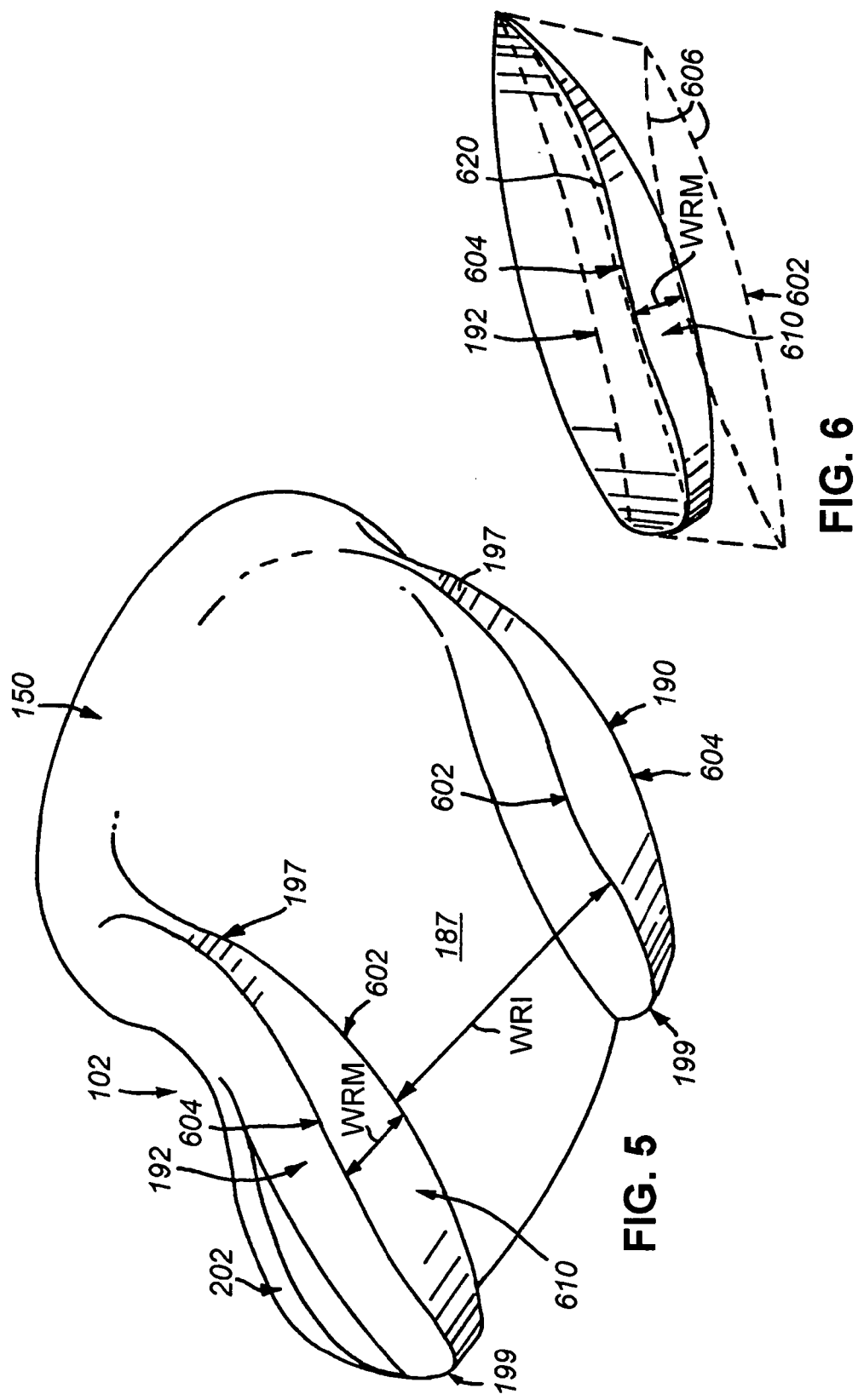

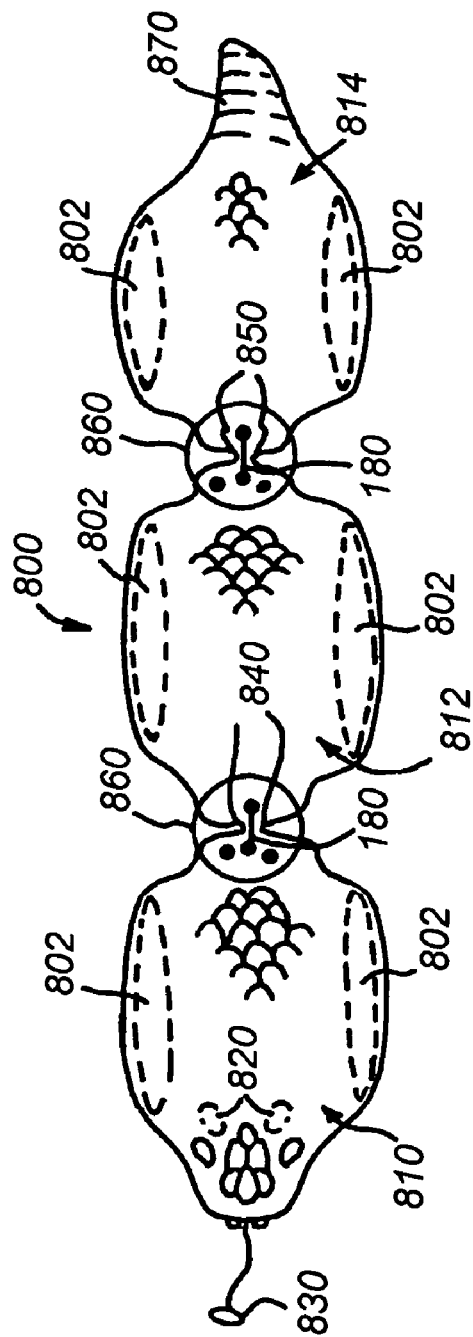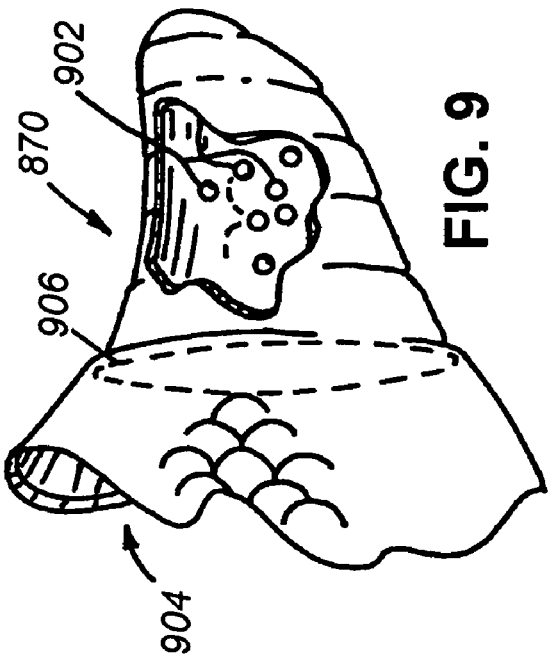

US 7,100,927 B2

ARTICULATED STEERABLE SLED

BACKGROUND OF THE INVENTION

1. Field of the Invention

This invention relates to recreational sleds and more particularly to sleds having segmented body structures adapted to be steerable.

2. Background Information

Sleds constructed with molded plastic bodies have become highly popular in recent years. Many of these sleds feature sculpted underbody shapes with runners and/or grooves molded into their bottom to define the sliding surface. The geometry of the sliding surface may facilitate steering of the sled through shifting of the rider's weight distribution to allow certain steering structures of the surface to pressurably engage to snow while other opposing steering structures disengage—thereby forcing a turn to be carved in the prevailing turn direction of the engaged steering structure.

Often, steering structures are formed on the sled bottom as one or more outwardly facing concave edges in a manner similar to modern "shaped" skis and snowboards. Such structures enable steering by a rider such that the rider must lean in a direction opposing the turn in order to carry out the turn. In other words, steering in a particular direction is carried out by shifting one's weight onto an opposing outer edge from the direction into which the turn is to be made.

Modern molding techniques and materials have made possible highly complex and ergonomic sled designs that define carefully contoured sliding surfaces and body-conforming tops. One such modern sled is shown and described in U.S. Pat. No. 4,262,919 entitled ARTICULATED BODY-STEERABLE SLED WITH ADD-ON MODULES by Krent, the teachings of which are expressly incorporated herein by reference. This sled relies upon molded body modules or segments, joined by flexible hinge joints to derive a multi-segment sled (essentially a coupled "train" of segments) that can be ridden by one or more riders in either a seated or head-first, prone position. Steering is facilitated (in part) by the fact that the segments can be turned with respect to each other within a horizontal plane (e.g., a yaw direction).

While the sled shown and described in U.S. Pat. No. 4,262,919 effectively deals with control and turning in a long, molded sled body, it still provides largely conventional runners having substantially parallel edges along their entire length. Hence, this sled is still limited in its ability to steer sharply and accurately, requiring the rider to lean away from the direction of the turn, in a largely conventional fashion.

It is desirable to provide a sled, having multiple segments, which incorporates a more natural steering motion, such as one that requires to rider to lean into the direction of the turn, like a bicycle. In addition, such a sled should afford the user more range of motion in multiple axes when traversing uneven terrain and obstacles.

SUMMARY OF THE INVENTION

This invention overcomes the disadvantages of the prior art by providing an articulated, multi-segment sled body having, on each segment, a pair of runners each having opposing convex side edges. These convex side edges allow turning to occur on each of the appropriate inside and outside edges of opposite runners in each segment with the rider leaning into the turn, rather than away from it. A detachable and flexible joint connector is provided between each segment. This connector allows (with respect to a sled longitudinal axis) both yaw-direction rotation between segments as well as axial roll-direction rotation between segments (e.g., two-axis rotation) so as to provide the rider better control and more conformance over bumps and uneven terrain.

In an illustrative embodiment, the runners of each segment include a gently sloped (relatively low angle relative to the ground) leading end. The front segment of the sled includes a raised front end terminating in a top that allows the sled to traverse relatively deep snow. The front segment, along its top, also includes a pair of T-shaped handles for better grip and steering control. The bottom sliding surface of each of the runners can be provided with one or more a molded-in, metal edges that provide further strength, stiffness and carving ability on hard-packed snow and ice.

In an illustrative embodiment, the connectors include a relatively thin web joining opposing cylindrical ends in the manner of a "dog bone" shape. At least one connector end may be permanently/semi-permanently attached to the segment, preventing loss, and the opposing connector end can be detachable from a conforming slot or socket in an adjacent segment, and can include a pair of domed projections located along the cylindrical surface of the connector end. These projections are adapted to slide into (and mate with) detents defined along the surface of the slot or socket in the sled segment. This prevents the connector end from sliding axially out of the slot or socket under normal loads. In one embodiment, the sled body can have a shape simulative of a segmented animal body, such as a snake, and the individual connectors can be housed within molded, continuous body sidewall sections that pinch to a narrow region in the area of the connector. In such a shape, a tail end can include a novel noisemaker such as a rattle.

BRIEF DESCRIPTION OF THE DRAWINGS

The invention description below refers to the accompanying drawings, of which:

FIG. 5 is a perspective view of the underside of a front segment of the sled of FIG. 1;

FIG. 6 is a partial perspective view of the dual-convex-edge geometry of runner of the sled segment shown in FIG. 5;

FIG. 8 is a top view of a multi-segment, steerable sled, according to another embodiment of this invention having a fanciful snake design; and FIG. 9 is a more-detailed exposed perspective view of the tail of the snake design sled of FIG. 8 featuring a rattle.

DETAILED DESCRIPTION OF AN ILLUSTRATIVE EMBODIMENT

Figure 1:
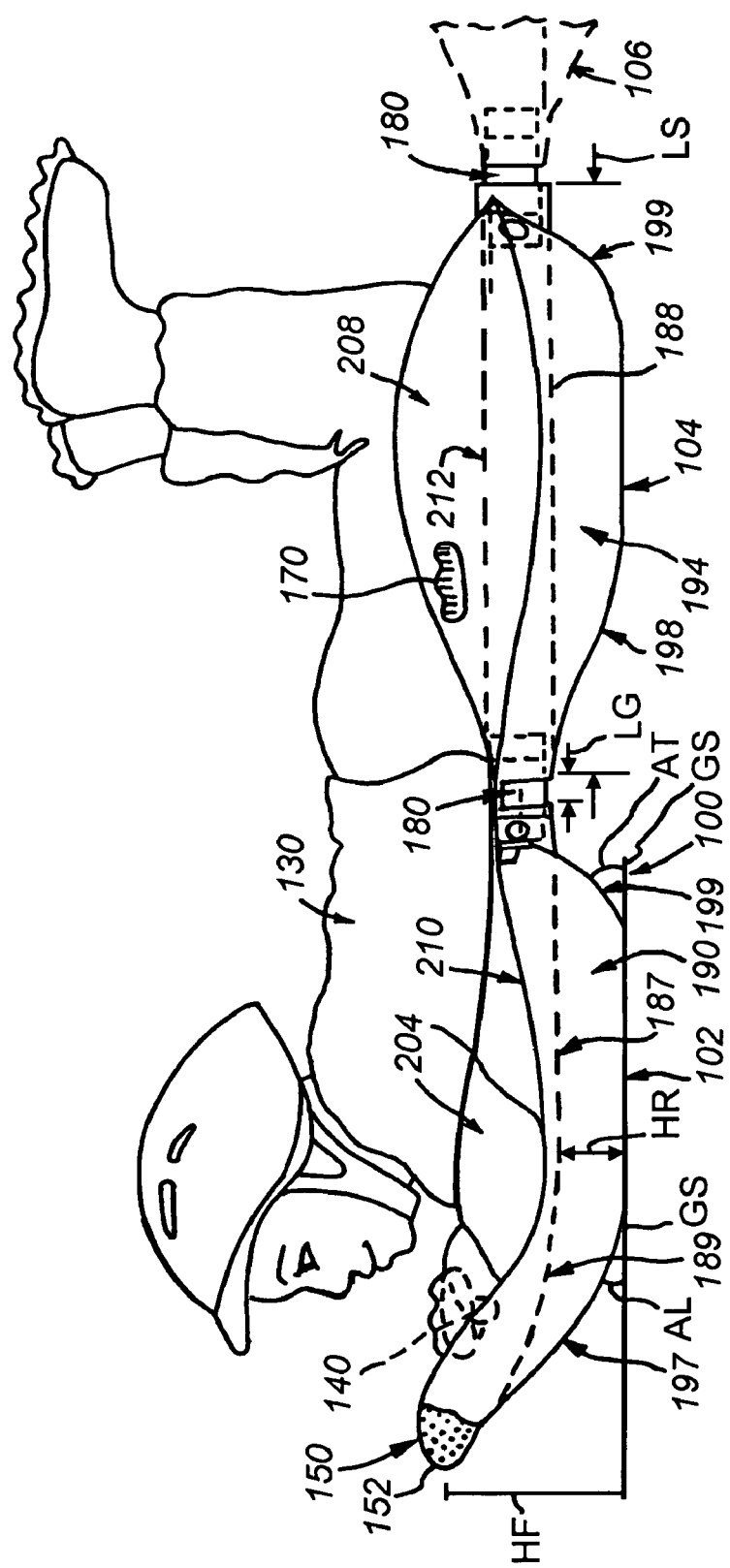
FIG. 1 is a partial exposed side view of an articulated, multi-segment, steerable sled according to an illustrative embodiment of this invention.

A recreational sled 100 having an articulated body constructed from at least two or three individual body segments 102, 104 and 106 (shown partially in phantom). As discussed further below, each segment in this embodiment may be unique to its particular location within the overall sled. In other words, there is a front segment 102, one or more central segments 104 and a rear segment 106. It is expressly contemplated that the number of segments is highly variable, and the sled can be adapted to receive additional "extension" segments for creating quite long articulated sled bodies. In addition, the center segments can act as a rear segment in various alternate embodiments.

Note that the sled body segments and other components shown and described herein can be constructed from a variety of materials or combination of such materials. In the illustrative embodiment, each sled segment is constructed from a durable polymer, such as polyethylene or polypropylene, and is formed into the desired sculpted shape by a blow-molding or rotational molding process, in which the internal structure of the segment is largely hollow and load-bearing strength is provided mainly by the molded skin. Appropriate stiffeners and beams can be molded into the structure where needed. Other attached components can be secured to each segment by conventional snap fittings or structures (typically of plastic/polymer) and/or metal fasteners where appropriate.

Figure 2:
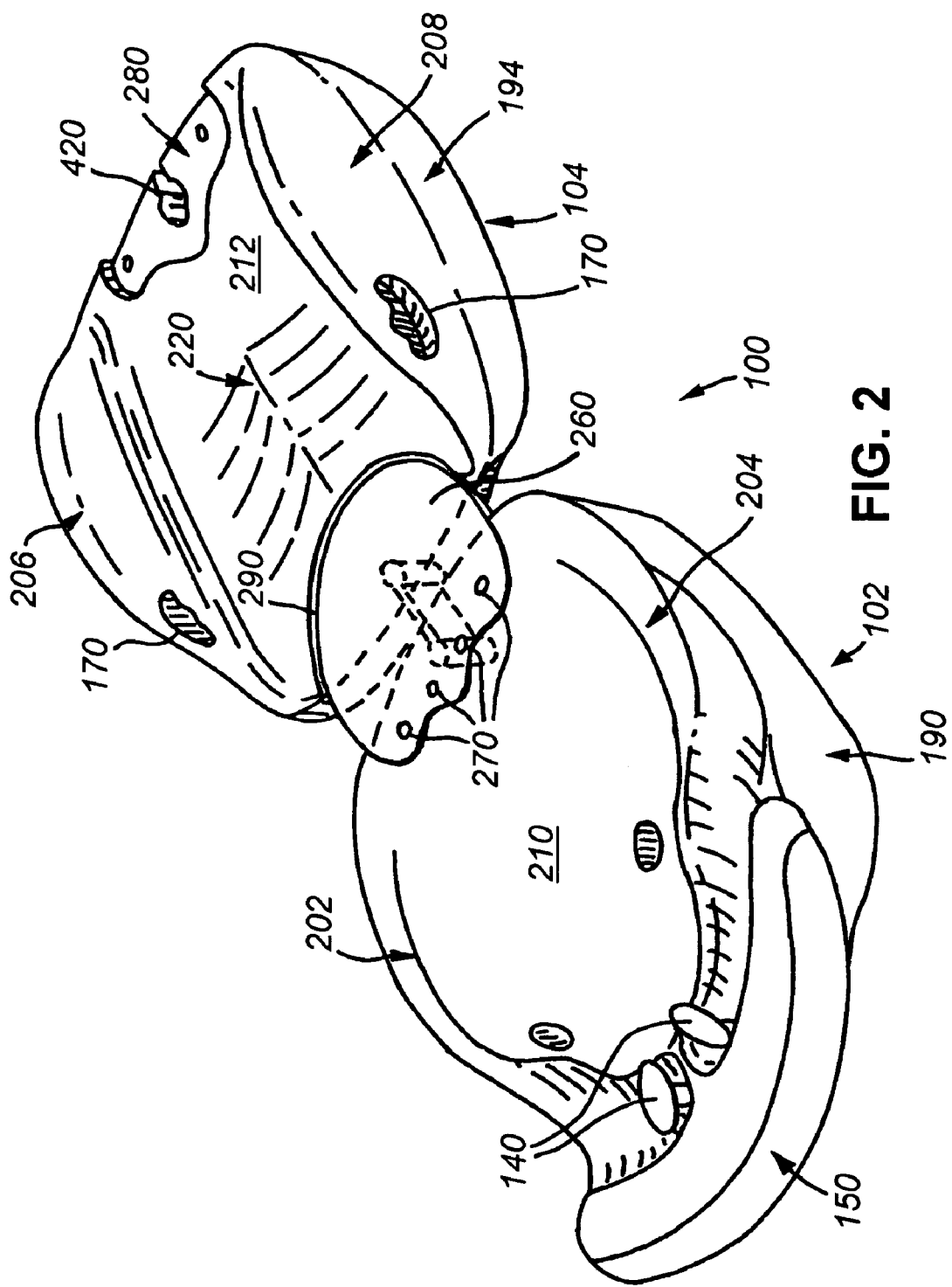
FIG. 2 is a partially exposed perspective view of the sled of FIG. 1 an exemplary front body segment and center body segment.
Figure 3:
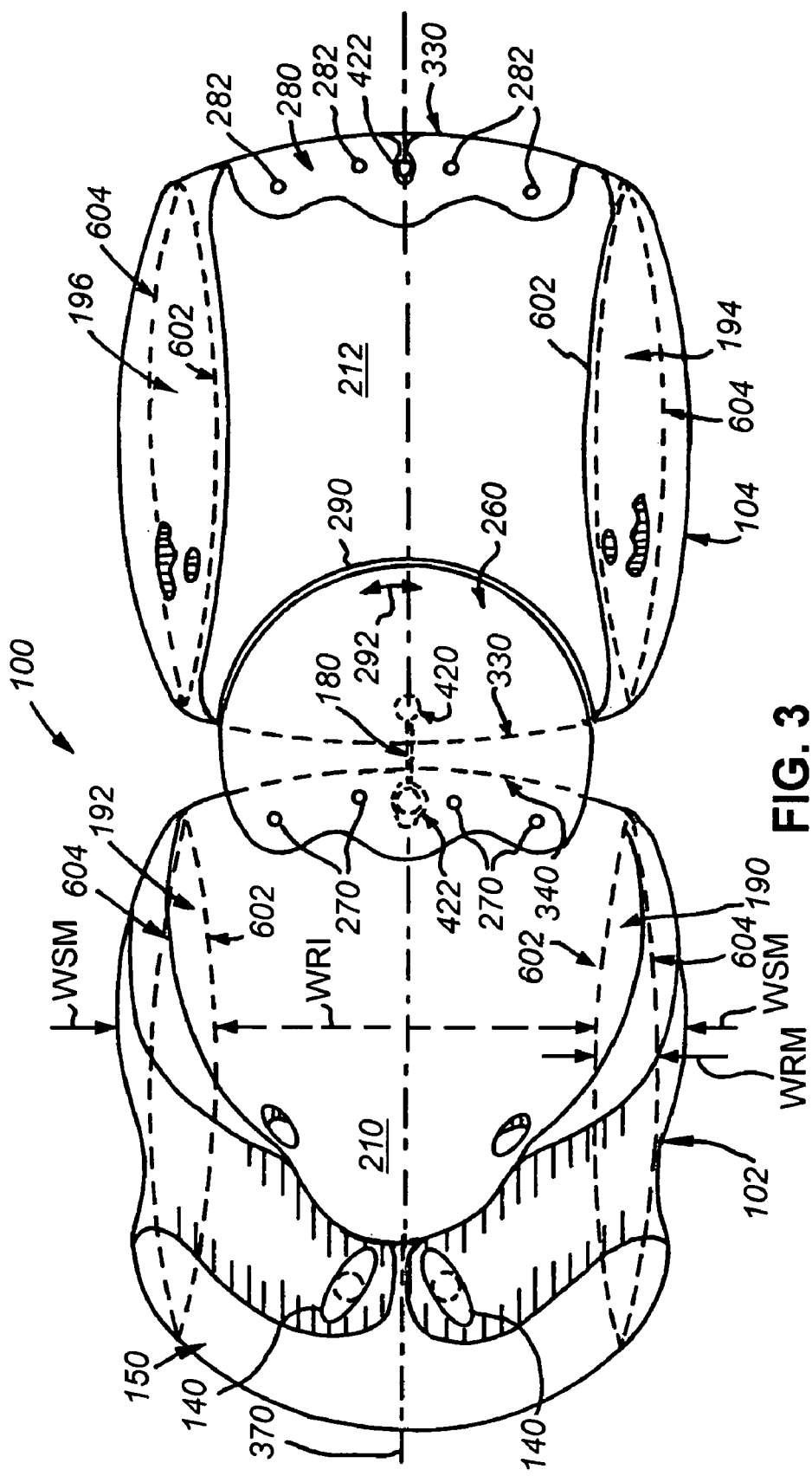
FIG. 3 is a partially exposed top view of the sled segments of FIG. 2.

With further reference to FIGS. 2 and 3, respectively showing the partial sled body in perspective and top views, the top surface of the sled is sculpted to include raised shoulders 202, 204, 206 and 208 that define an inner well 210, 212 in each segment into which a rider 130 sits or lays. In particular, in FIG. 1, the rider 130 is shown lying in a prone position across at least two segments (front and center) 102 and 104 of the sled. It is expressly contemplated that the top surface of each segment can define a sculpted seat for receiving the rider, alternately, in a sitting position. As such, multiple riders, variously positioned in an upright, seated orientation in the sled can also ride in tandem, in the manner of a toboggan.

As detailed in FIG. 2, the center of one or more segments can be formed with a slightly raised hump 220 along its longitudinal axis in order to receive the rider's legs or buttocks. In a seated position the rider's legs would typically extend into the well 210 of the front segment. However, the top surface of the front segment (at its frontmost end 150) also includes a pair of T-shaped handles 140, which the rider 130 can grasp with his or her hands as shown. These T-shaped handles are spaced (widthwise) approximately 3–10 inches apart and afford the rider excellent control in the prone position during steering maneuvers, as described generally below.

The frontmost end 150 of the front segment 102 is raised to an elevated height HF of approximately 8 inches. Note that this height range is highly variable, however. As will be described further below, when traversing deep snow, the elevated height of the sled's front end, which in this embodiment is generally free of any openings or holes beneath the top edge 152, allows relatively deep snow to be traversed without that snow invading the interior top wells of the sled. The raised side shoulders 202, 204, 206 and 208 further facilitate traversal of deep snow, as they channel it away from the interior wells, forming instead a trench along either side.

To further facilitate the rider's grip in a seated position, a pair of gripping holes, integrated handles, 170 are provided on each side of the center segment (104) sidewalls 206 and 208. In this position, the rider's feet extend forwardly as described above, and thereby provide steering to the sled while the holds 170 are gripped firmly to maintain the rider in his or her seated position.

The length and shape of each body segment is highly variable. In this embodiment, the length LS of the average segment is approximately 22–25 inches. The maximum width WSM of the segment to its outer edges is approximately 20–24 inches. However, these exemplary length and width measurements, along with other measurements defined herein, are highly variable and can be scaled to the expected size of the particular rider. For example, for younger children, the sizes may be scaled smaller, while for older children and adults, the scale may be increased as appropriate.

Figure 4:
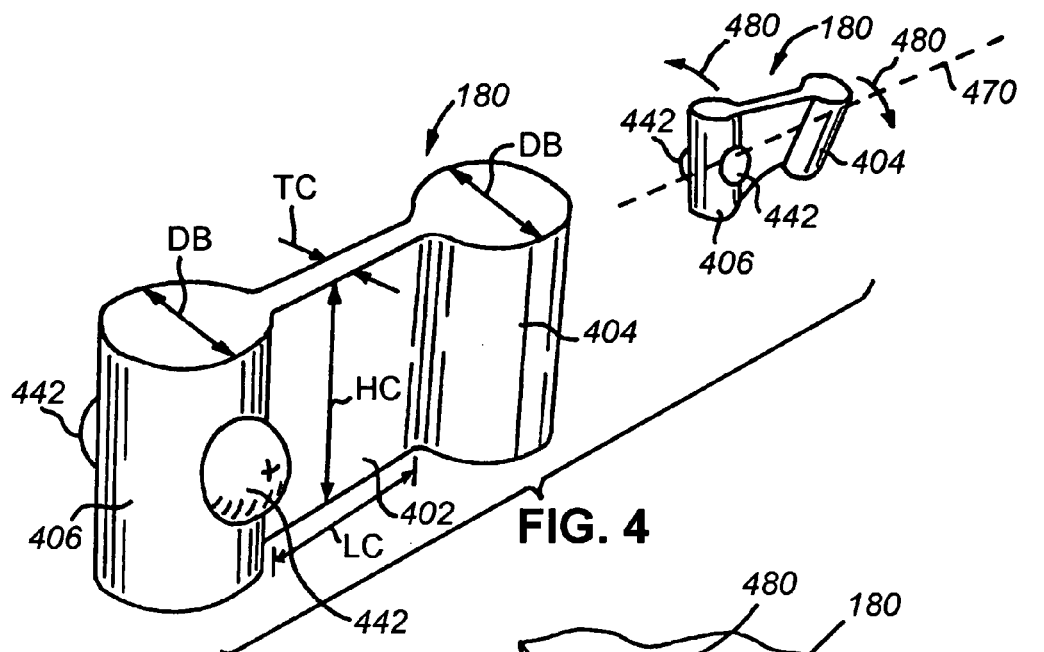
FIG. 4 is a perspective view showing a joint connector for use in joining segments of the sled of FIG. 1 and roll-axis flexure of the connector.
Figure 4A:
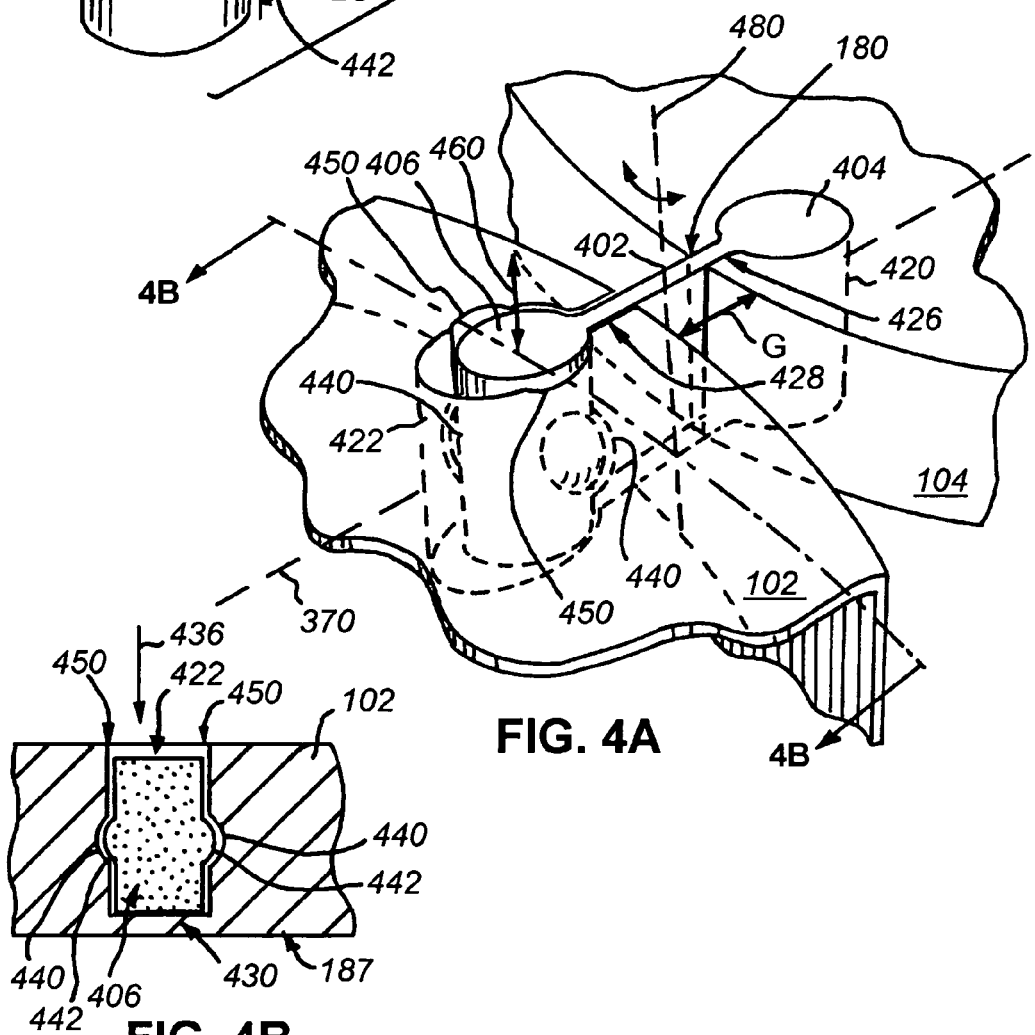
FIG. 4A shows a partially exposed perspective view of the connector of FIG. 4 installed between two sled segments.

To facilitate the connection between segments, a set of flexible joint connectors in the general shape of a "dog bone" are provided. The connectors 180 are shown in further detail in FIGS. 4 and 4A. In this embodiment, they are constructed from a resilient, flexible, long-lived material such as polypropylene. In other embodiments, they can be constructed from any number of appropriate materials including reinforced synthetic or natural rubber, or other polymers. In this embodiment, each connector has a thin, flattened central web 402 having a height HC of approximately 1–2 inches, a length LC of approximately 1–2 inches and a thickness TC of approximately ⅛–¼ inch. These dimensions are variable, however, depending upon the material used and overall size of the sled. On each opposing side of the web 402 is formed an enlarged-diameter cylindrical end 404 and 406. Each cylindrical end 404, 406 has a diameter DB of approximately ¾–1¼ inch. Again, this dimension is highly variable depending upon the material used for the connector and for the sled.

The dog bone-shaped connectors 180 are inserted into opposing cylindrical slots or sockets 420 and 422 on the edges of two adjoining segments. The slots are positioned in line with the symmetrical longitudinal axis (370 in FIG. 3) of the sled. The slots 420, 422 are spaced from the edge of each segment (front or rear edge of the segment as applicable) so that the connector's web 402 is partially exposed (thereby exhibiting a gap G between adjoining segment front/rear ends) to allow it sufficient room to flex in two axes as described further below. A narrowed lead-out slot 426 and 428 extends between each respective cylindrical slot/socket 420 and 422 and the segment's front/rear edge to capture and guide the connector web 402.

Figure 4B:
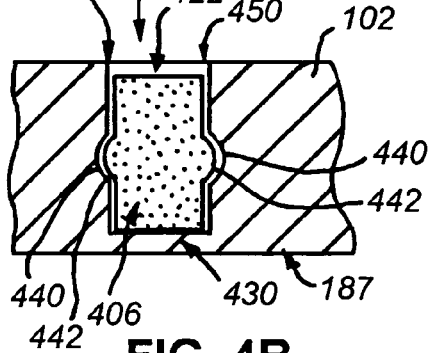
FIG. 4B is a side cross section taken along line 4B—4B of FIG. 4A.

To avoid excess play, the diameter of the cylindrical slots 420 and 422 should be chosen so that they conform relatively closely to the dimensions of the respective connector end 404 and 406. In this embodiment, each segment's (104) front-end slot 420 (except the front segment 102, which has no connector in this embodiment) receives a semi-permanently mounted end 404 of the connector 180. This end can be captured during molding, attached with fasteners or cemented in place. As should be clearer in the cross section shown in FIG. 4B, the bottom end 430 each slot 420, 422 (slot 422 in this example) can be enclosed so that the connector end 404 cannot pass further downwardly (arrow 436) through the slot 420 past the capped bottom 430.

The opposing slot 422 (rear slot of front segment 102) has slightly enlarged channels 450 in its sides that extend downwardly to a pair of detents 440. These detents are adapted to receive opposing domes 442, formed along the sides of the connector's cylindrical end 406. During attachment of the central segment's connector end 406 to the rear slot 422 of the adjoining segment (102), these domes are driven downwardly along channels 450 on the side walls of the slot 422, where the end 406 and slot 422 deform elastically until the domes 442 reach the detents 440. In this position, the domes 442 spring back into engagement with the detents 440 and secure the connector 180 against perpendicular movement (double arrow 460) until the connector end 406 is, again, forcibly removed from the slot 422.

The gap G formed by the placement of the slots, in conjunction with the length of the web 402, provides the hinge between segments. The web enables flexure within the horizontal plane along a yaw axis (the dashed line 480 perpendicular to the longitudinal axis 370). Such yaw-axis hinge movement is shown generally in FIG. 7. In addition, the resiliency of the connector of this embodiment allows rotation (curved arrows 480) about the longitudinal axis 370, as shown generally in FIG. 4. Accordingly, the longitudinal axis can be termed the "roll" axis, where it passes through the approximate center of the web 402. Thus, the connector 402 of this invention supports at least two forms of rotational movement. It supports yaw and also roll. The degree of yaw and roll supported depend, in part, upon how much of the web is exposed, the material used, and also the thickness and height (TC and HC, respectively) by which the web is defined.

While a connector 180 that is semi-permanently or permanently fixed at one end and detachable at the other is provided, it is expressly contemplated that the connector can be attachable to and detachable from the slots in both adjoining sled segments in an alternate embodiment. Likewise, the connector can be semi-permanently/permanently filed at the rear edge and detachable at the adjoining front edge, or semi-permanently/permanently attached at both ends where the sled body is meant to remain in a particular configuration (perhaps having a coupler at the rearmost end for further add-on segments to the basic, permanent segments).

As detailed in FIGS. 2 and 3, a plate 260 is secured over the connector 180. This plate 260 helps to avoid harmful pinching of digits, etc. as the segments turn in a yaw axis with respect to each other, and also assists in retaining the connector's detachable end 406 against unwanted disengagement from the slot 422. In this embodiment, the plate 260 is attached by four flared, plug snaps (or other types of fasteners/screws) 270 that are secured to the rear end of each segment. Each segment includes a rear-end recess 280 with appropriate receiving holes 282 for the plate securing members (screws, pegs, etc.). Likewise, a front recess 290 is formed on the front end of each segment (except the front segment 102). This recess allows rotation (double arrow 292) of the rear end of the plate 260 as the sled rotates in the yaw direction. The plate is constructed from a flexible polymer and is sufficiently resilient so that it bends as the segments roll with respect to each other about the longitudinal axis 370. A variety of interconnecting members and mechanisms can be used to secure the plate to the associated body segment. While, in this embodiment, the plate 260 is secured to the front segment (102) of the two adjacent segments, it is also contemplated that it can be secured to the rear (104) of two adjacent segments and allowed to rotate freely with respect to the front segment (102). Other alternate covering plate mechanisms can be used, or, in alternate embodiments, the plate can be omitted in favor of other hinge-covering structures (or, in fact, no covering structure).

In this embodiment, each body segment includes a curved or radiused end 330 and 340 (see FIG. 3) to allow hinged yaw-axis rotation of the segments with respect to each other within a predetermined range of rotation. In other words, each segment-end's curvature is sufficient to define a desired degree of rotation between segments. In one embodiment, the segment-ends each have sufficient curve to allow a turning arc of between 9 and 13 feet. However, any desired turning radius can be accommodated. In general, the permitted turning arc should not be so extreme as to cause unwanted "jack-knifing" of the sled—given its expected use and the level of skill of its riders (e.g. high-performance sleds may permit more extreme maneuvers).

With further reference to FIGS. 5 and 6, as well as FIG. 1, the sled runner geometry is now described in further detail. Each body segment 102, 104 includes a pair of runners parallel 190, 192, 194 and 196. Each runner includes a gently sloped (e.g. lower acute angle AL relative to a ground surface GS) leading edge 197 (runners 190 and 192) and 198 (runners 194 and 196). Likewise, a steeper (higher acute angle AT relative to a horizontal ground surface GS) trailing edge 199 is provided. This geometry facilitates easier entry into deep snow. The angle of the leading and trailing edges is highly variable, but should be chosen to provide sufficient bottom surface to each runner so that it slides easily through various snow conditions. In one embodiment, the leading edge's angle AL is approximately 20 degrees to 40 degrees (on average) and the trailing edge's angle AT is approximately 40 degrees to 70 degrees, but these angles as well as the overall curvature of the leading and trailing edges are highly variable.

The runners 190, 192, 194 and 196 have a clearance height HR of approximately 3 inches in this embodiment, with respect to the bottom surface 187 and 188 (aligned with GS) of each segment. In this embodiment, the lower side of each segment's supporting platform (between runners) is substantially flat, but can include recessed or projecting beams and other formations where desirable. Note, in FIG. 1, that the leading edge 189 of the bottom side 187 of the front segment 102 is also swept slightly upwardly to further facilitate entry into deep snow.

The novel double-convex geometry of a typical sled runner (192 in this example) as shown schematically as dashed lines 602 in FIG. 6. As shown, the runner generally defines a pair of largely symmetrical opposing convex-shaped lines 606. These lines are extensions from the sidewalls of the runner that end in opposing convex bottom edges 602 and 604. In other words, the edges 602, 604 are narrower (or pointed) where they meet at their opposing lengthwise ends and spaced wider-apart in their mid-section. In practice, runners' leading and trailing edges are not sharply pointed, but typically rather blunt. Points are shown in the schematic outline 602 for to illustrate the geometrical intersection of the two opposing convex edge shapes.

In this embodiment, the maximum runner edge-spacing or width (WRM) is approximately 2½–3½ inches. However, this width can be highly variable depending upon the size and load-capabilities of the sled. The bottom surface 610 of each runner is flat across its widthwise direction in the illustrative embodiment. In an alternate embodiment, the bottom surface of each runner can be slightly concave, as a hollow ground skate blade in the widthwise direction. The runner is also generally flat along its length-wise direction between the leading edge 197 and trailing edge 199. In one embodiment, the bottom or its opposing edges can include thin-metal inserts 620 (shown as a dashed line along the bottom surface 610). These metal inserts can be attached in a variety of ways. In one embodiment, they are molded into the bottom of each runner, and thereby provide stiffness and enhanced carving ability to the bottom of each runner for harder snow and ice conditions. The runners 190, 192, 194 and 196 each define a minimum distance therebetween (e.g. the width across the segments bottom side) of approximately 12–15 inches in this embodiment. Of course, this distance may vary for differently sized sleds. Along the leading and trailing edges of the runners, the spacing/bottom-side-width widens, as the inner edge 602 defines the novel convex shape of this embodiment.

Figure 7:
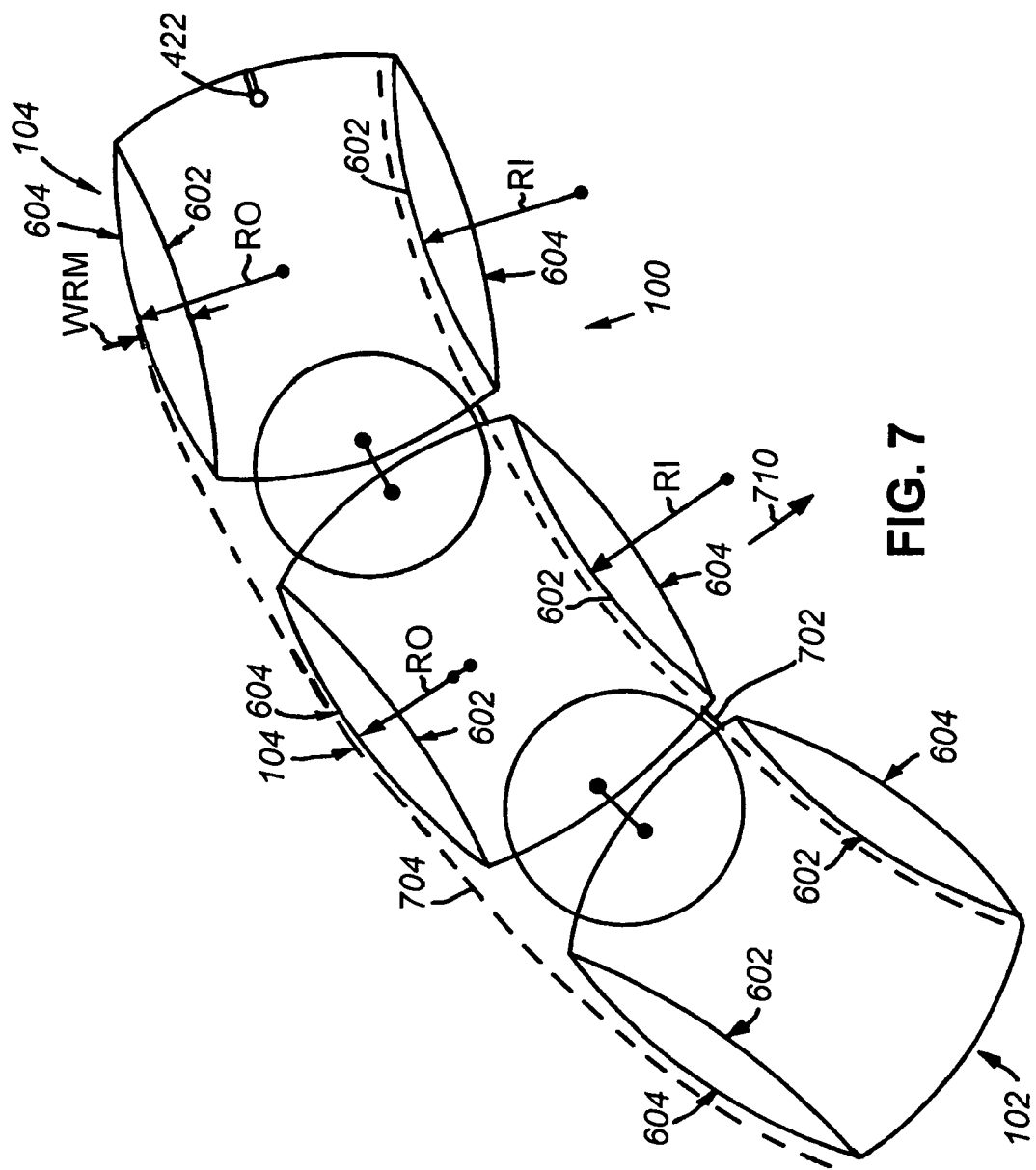
FIG. 7 is a top view of the sled according to an illustrative embodiment showing the tracking of three interconnected sled body segments through a turn in which the connectors exhibit yaw-axis flexure.

FIG. 7 further details the cross-sectional geometry of the runners and their resulting ability to track through a turn, according to an illustrative embodiment. The sled 100 in FIG. 7 is composed of a front segment 102 and two trailing "center" segments 104. In practice, the rear trailing segment can be a rear segment, as described below. Further segments can be attached to the rearmost segment via the connector slot 422.

As illustrated in FIG. 7, the opposing convex runner edges 602 and 604 facilitate tracking of the sled around a turning arc (dashed lines 702 and 704) that is approximately 9 feet–13 feet maximum in this embodiment. To trace such an arc, the inner edges have a radius RI of between 4 feet and 7 feet. Similarly, the outer edges 604, have a radius RO of between 4 feet and 7 feet. In this embodiment, the radii for the outer and inner edges, respectively, are the same. However, in alternate embodiments, it is contemplated that the inner runner edge may have a different radius than the outer runner edge.

To execute an arcuate turn, as shown in FIG. 7, the rider directs his or her weight toward the center point of the arc, as shown by the arrow 710. In other words, the rider "leans into the turn." The rider simultaneously turns the segments to generate the bent shape between the first front segment and adjoining center segment 104. This can be accomplished in either the seated or prone position using legs and arms, as well as the torso (in the prone position) as appropriate. Steering of the sled 100 is, thus, quite straightforward, and generally conforms to natural body movements. Likewise, stopping the sled follows natural patterns that are facilitated by the tight turning radius and flexibility of the design. To stop, the rider may execute a tight leaning turn that brings the sled quickly into a position perpendicular to the fall line of the hill. Because the runners are defined by opposing convex edges 602 and 604, the outer runner 604, adjacent the outer arc 704, provides steering as the rider leans into the turn. Likewise, the inner edge 602, adjacent to the inner arc 702, provides a conforming steer to the inner runner of the sled. During straightforward motion, neither edge predominates and the sled travels in a straightforward direction with approximately equal pressure on each opposing edge.

It should now be clear to the reader that the above-described novel sled construction provides a highly maneuverable single-person sled with at least one articulated joint or a multi-person toboggan-style sled that is capable of highly agile slalom-like maneuvers. The two-axis maneuverability of the connector further facilitates traversal of rough terrain, moguls and bumps.

FIG. 8 shows a stylized version 800 of the sled design in accordance with an embodiment of this invention having runners 802 of a geometry described generally above with opposing convex edges and two-axis-flexing connectors between body segments. The sled 800 of this alternate embodiment defines the fanciful surface shape of a snake, including a front segment 810 simulative of a head, a center segment 812, simulative of a mid-torso, and a rear segment 814, simulative of a tail. The head segment 810 includes front handgrips 820, as described generally above and internal surface contours for receiving one or more riders within a depressed well. The head segment 810 also includes a forwardly projecting pull rope 830 for ease-of-transport. In this embodiment, the segments are molded continuously and joined at "pinch points" 840 and 850. The pinch points 840, 850 can be slotted at their tops (or bottoms) for insertion of connectors 180, as described generally above. Caps 860 can cover the connectors 180 and be joined to at least one segment, as described generally above. In addition, note that any of the sleds described above can be provided with a single-molded segment design in accordance with the description of FIG. 8. It is contemplated that, over time, the pinch points 840 and 850 may fail through cyclic loading. This is acceptable because the connectors 180 provide the main load-bearing strength to each connection between segments.

The tail segment 814 of the sled 800 includes, at its rearmost end, a novel rattle feature 870. The rattle feature 870 is shown in cutaway in FIG. 9. Within the hollow rattle is mounted a number of loose balls 902 that are constructed from metal, plastic or another acceptable material. These balls are provided in sufficient number to generate a hollow rattling sound within the tail. A separator between the tail rattle 870 and the remainder of the tail segment's interior 904 can be provided. This separator is shown as dashed line wall 906. A variety of other entertaining features including lights, horns and noise-making appliances (for example, a digitally synthesized snake hiss) can be provided to the sled of this or other embodiments described herein for the awareness and safety of fellow sledders.

The foregoing has been a detailed description of illustrative embodiments of the invention. Various modifications and additions can be made without departing from the spirit and scope thereof. For example, materials used herein, as well as the size and shape of components is highly variable. While high-strength plastics are used for the majority of parts, wood, metal and composite materials can be substituted where appropriate. In addition, while a particular ergonomic shape has been provided to the exterior and top of the sled, it is expressly contemplated that a variety of surface shapes can be used. In addition, seats and other structures can be added to one or more segments of the sled where appropriate. Further, while a flexible connector having enlarged cylindrical ends that slidably engage slots is shown, it is expressly contemplated that the enlarged ends can be any shape that allows the connector to seat within the end of a segment. In general, such ends are a continuous-cross-section shape to enable slidable engagement in a conforming slot, but the "enlarged ends" may be any connector structure, including ones that receive other fasteners, such as screws. Similarly, while domes are formed on the connector end and detents are formed on the connector slot, it is expressly contemplated that the domes and slots may be formed on the opposite components, or that other shapes and forms of locking mechanisms can be employed. Accordingly, this description is meant to be taken only by way of example and not to otherwise limit the scope of the invention.

What is claimed is:

1. An articulated sled comprising:
    a first body segment and a second body segment, each of the first body segment and the second body segment being interconnected by a flexible connector so that the first body segment and the second body segment can rotate with respect to each other about a first axis; and
    a pair of runners on the first body segment and a pair of runners on the second body segment each runner of each pair of runners including a sliding surface with an opposing outer convex edge and inner convex edge, each of the outer convex edge and inner convex edge extending lengthwise from a leading end to a trailing end of each runner, wherein each outer convex edge and inner convex edge in each runner, respectively, define a wider widthwise spacing there between in a central lengthwise region of the runner than the widthwise spacing at the leading end and the trailing end.

2. The sled as set forth in claim 1 wherein each runner includes a sloping leading end and a trailing end that each extend upwardly from the sliding surface, and wherein each leading end is sloped upwardly at a shallower angle, than an angle of slope of each trailing end.

3. The sled as set forth in claim 1 wherein each of the first body segment and the second body segment includes a connector slot that receives therein a conforming end of the flexible connector.

4. The sled as set forth in claim 3 wherein the first body segment comprises a front body segment having a raised end for deflecting snow, and including, adjacent the raised end, a pair of hand grips.

5. The sled as set forth in claim 4 wherein the hand grips comprise T-shaped hand grips.

6. The sled as set forth in claim 3 wherein a front end of at least the second body segment includes a fixedly mounted end of the flexible connector therein having a projecting opposing connector end that is adapted to removably interconnect to the connector slot formed in the rear end of the first segment.

7. The sled as set forth in claim 1 wherein the flexible connector is constructed and arranged to enable flexure along each of two perpendicular axes, the axes including a yaw axis and a roll axis with respect to a longitudinal line taken through a center of the sled.

8. The sled as set forth in claim 7 wherein the flexible connector comprises a pair of opposing connector ends and a web section extending between the connector ends, the web section constructed and arranged to flex along the yaw axis and the roll axis.

9. The sled as set forth in claim 8 wherein further comprising, mounted over the opposing connector ends, a plate that is secured to one of either the first body segment or the second body segment that moves freely with respect to an adjoining one of the first body segment or the second body segment.

10. The sled as set forth in claim 8 wherein the flexible connector includes, on at least one of the connector ends, raised surfaces constructed and arranged to removably engage detents within the conforming connector slot.

11. The sled as set forth in claim 1 wherein each of the first body segment and the second body segment respectively comprise a front segment and a central segment, and further comprising a rear segment interconnected to the central segment by another flexible connector.

12. The sled as set forth in claim 11 wherein the sled defines the shape of an animal, and wherein the front segment defines a head, the central segment defines a central body portion, and the rear segment defines a tail portion of the animal.

13. The sled as set forth in claim 12 wherein the rear segment includes a tail having a rattle therein.

14. An articulated sled comprising:
    a first body segment and a second body segment, each of the first body segment and the second body segment being removably interconnected by a connector having opposing connector ends that each attach to a connector location on each of the first segment and the second segment and wherein the flexible connector further includes, between the connector ends, a web constructed and arranged to enable the connector to rotate in at least two perpendicular axes, the web having a length and each connector location being positioned with respect to an adjacent edge of the first body segment and the second body segment so as to define a gap in which at least a portion of the web is exposed in the gap to flex in the at least two perpendicular axes including a roll axis and a yaw axis.

15. The sled as set forth in claim 14 wherein each of the first body segment and the second body segment includes a pair of runners and wherein each of the runners includes opposing convex edges that define a bottom sliding surface of the runner.

16. The sled as set forth in claim 15 wherein the bottom sliding surface of each of the runners includes a metal edge member.

17. The sled as set forth in claim 14 wherein the flexible connector includes at least one connector end constructed and arranged to be detachable at least one of the first body segment and the second body segment.

18. The sled as set forth in claim 17 wherein at least one connector end of the opposing connector ends is constructed and arranged to slidably engage a connector slot in at least one of the first body segment and the second body segment.

19. The sled as set forth in claim 18 wherein the connector end and the connector slot each include a portion of an interengaging locking mechanism that locks when the connector end is seated at a desired position within the connector slot.

* * * * *